United States Patent
Wang et al.

(10) Patent No.: US 11,438,423 B1
(45) Date of Patent: Sep. 6, 2022

(54) METHOD, DEVICE, AND PROGRAM PRODUCT FOR TRANSMITTING DATA BETWEEN MULTIPLE PROCESSES

(71) Applicant: EMC IP Holding Company LLC, Hopkinton, MA (US)

(72) Inventors: Xingshan Wang, Shanghai (CN); Xiaochen Liu, Shanghai (CN); Jiang Cao, Shanghai (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 17/491,323

(22) Filed: Sep. 30, 2021

(30) Foreign Application Priority Data

Jul. 22, 2021 (CN) .......................... 202110833108.9

(51) Int. Cl.
*H04L 67/141* (2022.01)
*H04L 67/01* (2022.01)
*H04L 67/60* (2022.01)

(52) U.S. Cl.
CPC ............ *H04L 67/141* (2013.01); *H04L 67/01* (2022.05); *H04L 67/60* (2022.05)

(58) Field of Classification Search
CPC ........ H04L 67/141; H04L 67/01; H04L 67/60
See application file for complete search history.

(56) References Cited

U.S. PATENT DOCUMENTS

| 2015/0081979 | A1* | 3/2015 | Banta ................. G06F 12/0804 711/143 |
| 2015/0312366 | A1* | 10/2015 | Ben-Yehuda ....... H04L 67/1097 709/213 |
| 2020/0364214 | A1* | 11/2020 | Zhuo .......................... H04L 9/50 |
| 2021/0096898 | A1* | 4/2021 | Tsirkin ................ G06F 12/1408 |
| 2021/0255791 | A1* | 8/2021 | Shimada ............... G06F 3/0607 |

* cited by examiner

Primary Examiner — Michael A Keller
Assistant Examiner — Thao D Duong
(74) Attorney, Agent, or Firm — Amin, Turocy & Watson, LLP

(57) ABSTRACT

The present disclosure relates to transmitting data between multiple processes. An example method includes: establishing, in response to receiving a request to transmit data between a client terminal process and a server process in a computing device, a communication connection between the client terminal process and the server process, allocating shared storage blocks to the communication connection in response to determining that available shared storage blocks exist in the computing device, and transmitting data between the client terminal process and the server process using the shared storage blocks. Corresponding devices and program products are also described. Beneficially, shared storage blocks can provide higher bandwidth for inter-process data transmission, thereby improving the performance of data transmission.

20 Claims, 10 Drawing Sheets

METHOD, DEVICE, AND PROGRAM PRODUCT FOR TRANSMITTING DATA BETWEEN MULTIPLE PROCESSES

RELATED APPLICATION

The present application claims the benefit of priority to Chinese Patent Application No. 202110833108.9, filed on Jul. 22, 2021, which application is hereby incorporated into the present application by reference herein in its entirety.

TECHNICAL FIELD

Implementations of the present disclosure relate to process management and, more specifically, to a method, a device, and a computer program product for managing data transmission between multiple processes in a computing device.

BACKGROUND

With the development of computer technologies, multiple processes can be run on a single computing device, and the multiple processes can co-operate in order to achieve more complex functions. A variety of inter-process communication methods have been proposed at present. However, existing communication methods have low performance, and unacceptable delays may occur when a large amount of data is transmitted. In this case, how to transmit data between multiple processes with higher efficiency has become a technical problem.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

Thus, it is expected to develop and implement a technical solution for transmitting data between multiple processes in a more effective manner. It is expected that the technical solution is compatible with existing process management technologies and is capable of managing inter-process communication in a more effective manner by modifying various configurations of existing processes.

According to a first aspect of the present disclosure, a method for transmitting data between multiple processes is provided. The method includes: establishing, in response to receiving a request to transmit data between a client terminal process and a server process in a computing device, a communication connection between the client terminal process and the server process; allocating shared storage blocks to the communication connection in response to determining that available shared storage blocks exist in the computing device; and transmitting data between the client terminal process and the server process using the shared storage blocks.

According to a second aspect of the present disclosure, an electronic device is provided, including: at least one processor; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided. The computer program product is tangibly stored on a non-transitory computer-readable medium and containing machine-executable instructions for performing the method according to the first aspect of the present disclosure.

BRIEF DESCRIPTION OF THE DRAWINGS

In combination with the accompanying drawings and with reference to the following detailed description, the features, advantages, and other aspects of implementations of the present disclosure will become more apparent, and several implementations of the present disclosure are illustrated here by way of examples rather than limitation. In the accompanying drawings.

DETAILED DESCRIPTION

Example embodiments of the present disclosure will be described in more detail below with reference to the accompanying drawings. Although example embodiments of the present disclosure are illustrated in the accompanying drawings, it should be understood that the present disclosure may be implemented in various forms and should not be limited by the implementations illustrated herein. Instead, these implementations are provided in order to make the present disclosure more thorough and complete, and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another implementation" means "at least one additional implementation." The terms "first," "second," and the like may refer to different or identical objects. Other explicit and implicit definitions may also be included below.

Multiple processes can be run on a computing device, and the multiple processes can co-operate in order to achieve more complex functions. Technical solutions have been proposed at present to communicate between multiple processes based on shared memory. However, these technical solutions are difficult to implement in complex environments due to limitations such as multiple processes, multiple threads, memory size limitations, thread load balancing, competition conditions, error handling, programming language differences, huge pages, etc.

Figure 1:
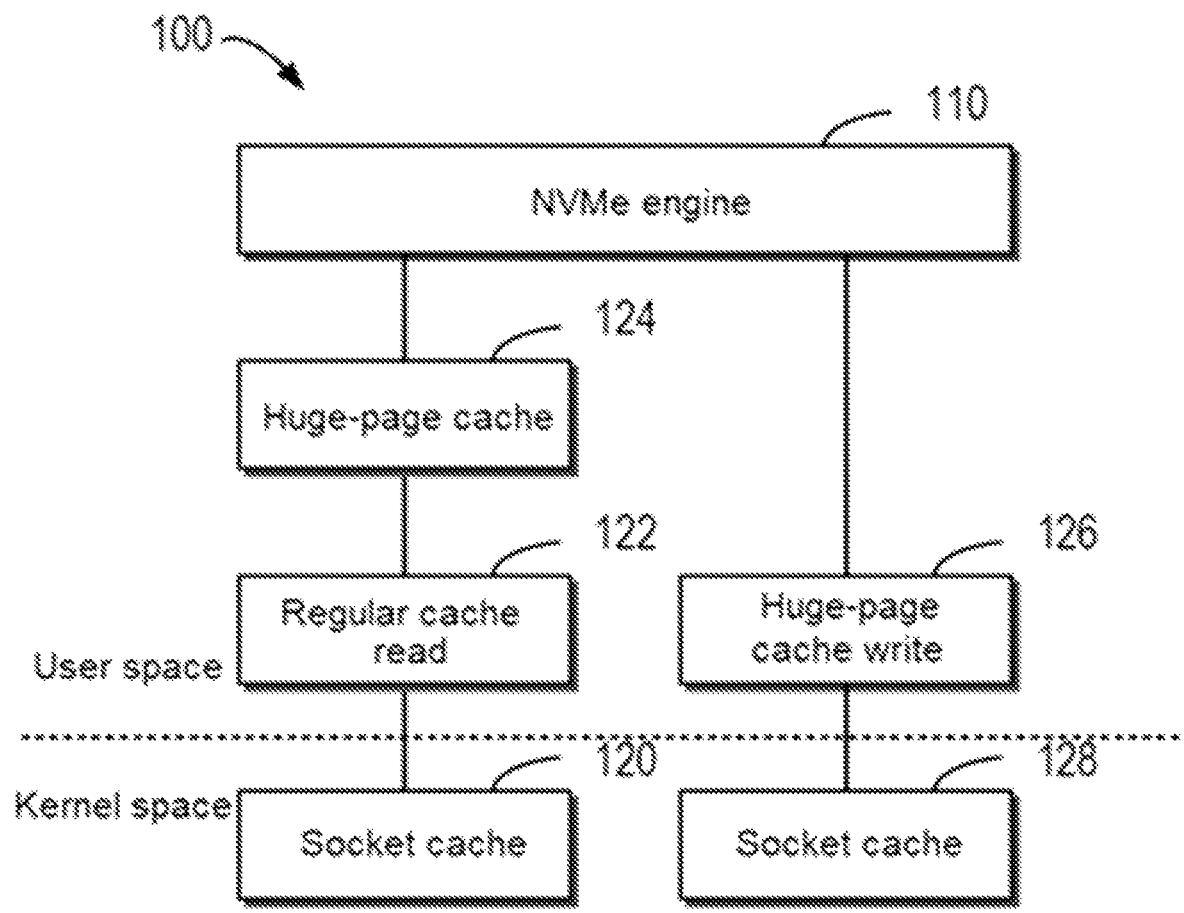
FIG. 1 schematically illustrates a block diagram of inter-process communication according to a technical solution.

For example, FIG. 1 schematically illustrates block diagram 100 of inter-process communication according to a technical solution. This figure illustrates a communication scheme based on Unix Domain Sockets (UDS). The communication scheme requires interaction between a user space and a kernel space. For example, regular cache read operation 122 can be performed on socket cache 120 in accordance with the size of regular cache. At this point, data to be transmitted in huge-page cache 124 needs to be processed via one or more regular cache read operations 122. Non-volatile memory express (NVMe) engine 110 can act as a transmission intermediary between two socket caches 120 and 128, and can write data to socket cache 128 via huge-page cache write operation 126.

It will be understood that existing inter-process communication methods have complex procedures and thus will lead to even more complex procedures when data needs to be synchronized between multiple processes. When a process includes multiple threads, it is necessary to further consider issues such as conflict between multiple threads and load balancing. For example, when multiple processes are written in different programming languages (e.g., Java and C++, etc.), the various programming languages have different ways to access a physical storage space in the computing device, which leads to the need for additional address translation services. As a result, existing inter-process communication methods are inefficient and have difficulty in providing uniform communication services for multiple processes.

Figure 2:
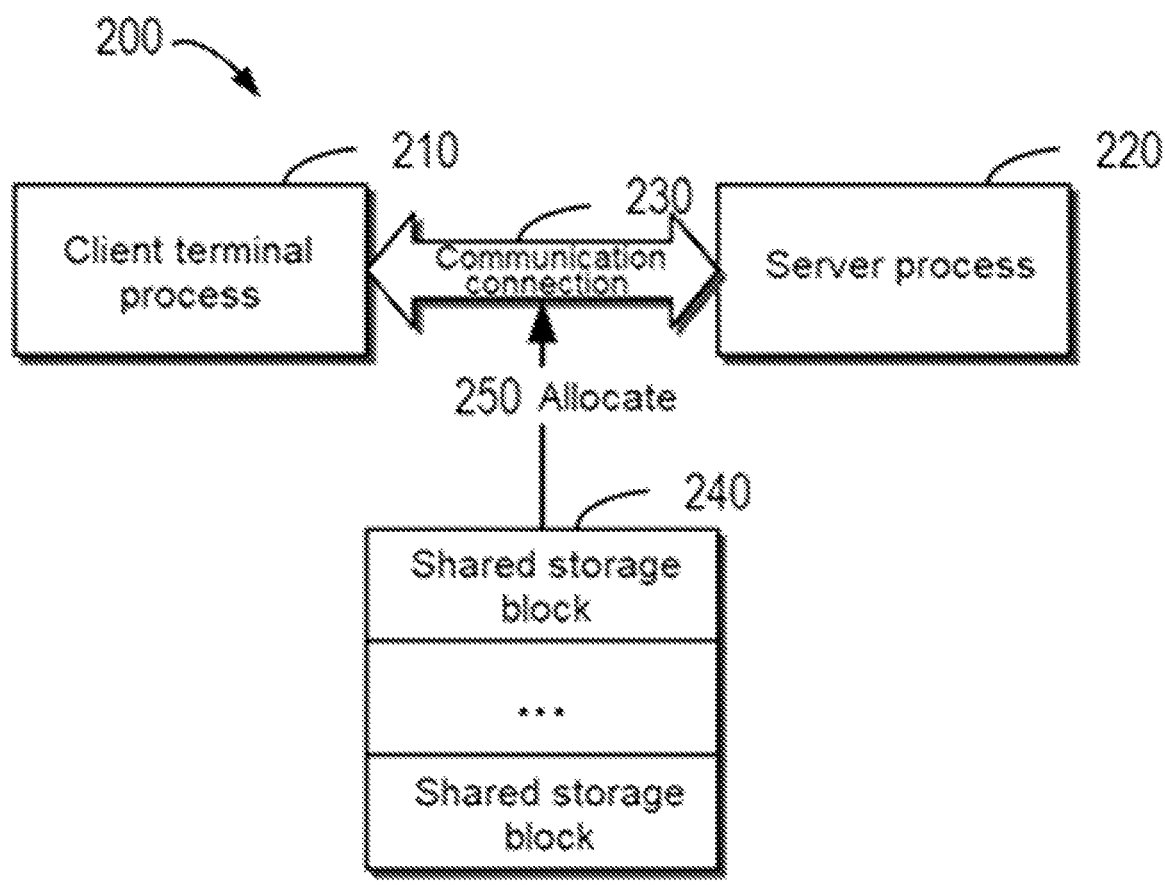
FIG. 2 schematically illustrates a block diagram for transmitting data between multiple processes according to an example implementation of the present disclosure.

To address the shortcomings of existing technical solutions, example implementations of the present disclosure propose a method for transmitting data between multiple processes in a computing device. Hereinafter, an overview of an example implementation according to the present disclosure will be described with reference to FIG. 2. FIG. 2 schematically illustrates block diagram 200 for transmitting data between multiple processes according to an example implementation of the present disclosure. As shown in FIG. 2, the processes can be divided into two types: client terminal process 210 and server process 220. Client terminal process 210 can request to establish communication connection 230 with server process 220. Thereafter, server process 220 can allocate 250 one or more shared storage blocks 240 to communication connection 230 such that client terminal process 210 and server process 220 can transmit data via shared storage blocks 240.

With the example implementation of the present disclosure, client terminal process 210 and server process 220 can transmit data via shared storage blocks 240, rather than via communication connection 230 itself. In this manner, the efficiency of data transmission can be greatly improved, and splitting larger blocks to be transmitted into multiple smaller transmitting blocks supported by communication connection 230 can be avoided.

Figure 3:
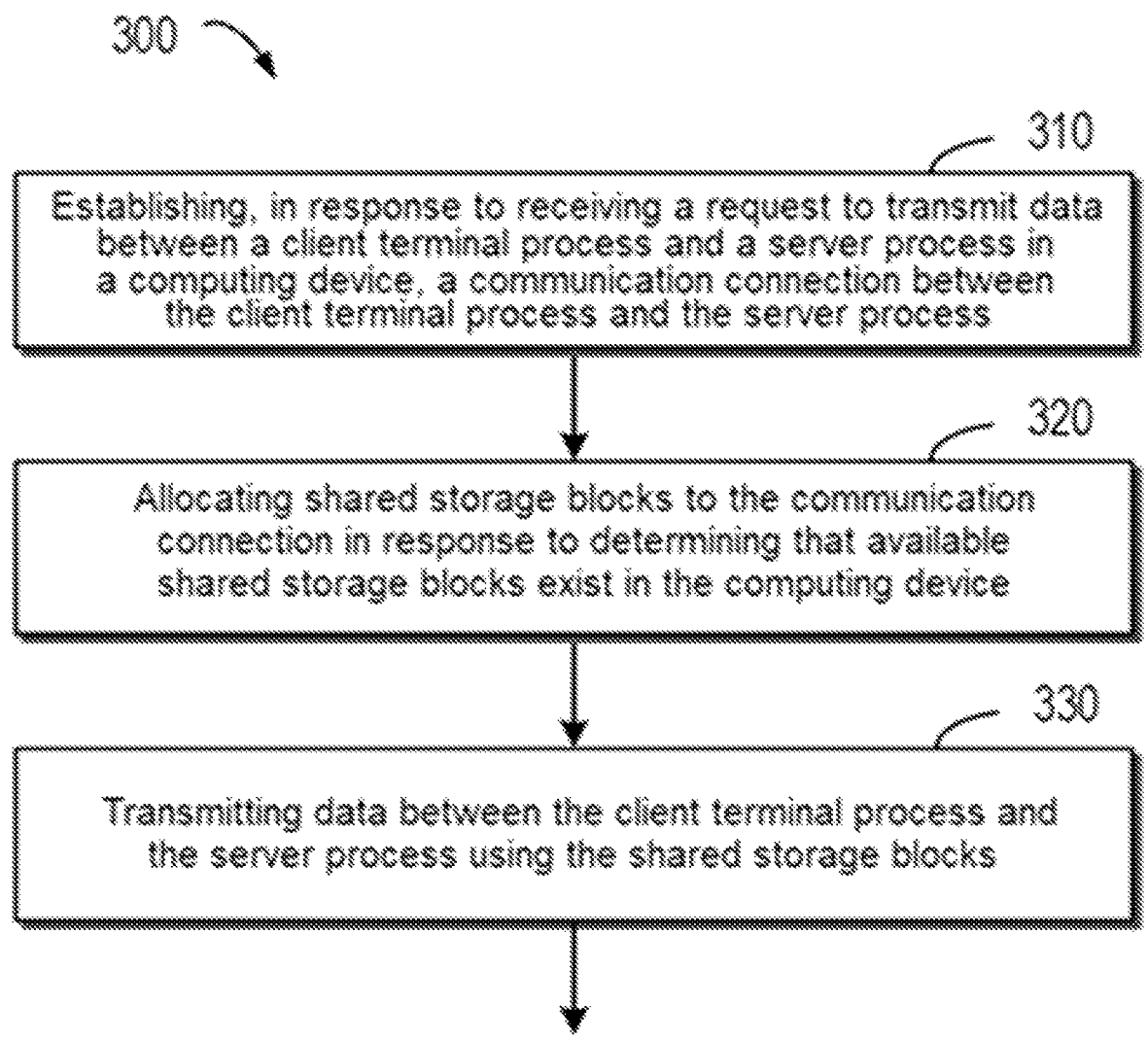
FIG. 3 schematically illustrates a flow chart of a method for transmitting data between multiple processes according to an example implementation of the present disclosure.

Hereinafter, more details of an example implementation according to the present disclosure will be described with reference to FIG. 3. FIG. 3 schematically illustrates a flow chart of method 300 for transmitting data between multiple processes according to an example implementation of the present disclosure. As shown in FIG. 3, at block 310, in response to receiving a request to transmit data between client terminal process 210 and server process 220, communication connection 230 is established between client terminal process 210 and server process 220. According to an example implementation of the present disclosure, the process initiating the request can be referred to as client terminal process 210, and the other process can be referred to as server process 220. Method 300 according to an example implementation of the present disclosure can be run at server process 220. Specifically, a management thread can be started in client terminal process 210 for monitoring connection requests from client terminal process 210.

Upon receiving a request from client terminal process 210, communication connection 230 can be established between client terminal process 210 and server process 220. Here, communication connection 230 can be a UDS-based connection, and a unique connection identifier can be assigned to established communication connection 230. According to an example implementation of the present disclosure, one or more communication connections can be established between client terminal process 210 and server process 220, and at this point, each communication connection has a corresponding connection identifier.

Figure 4:
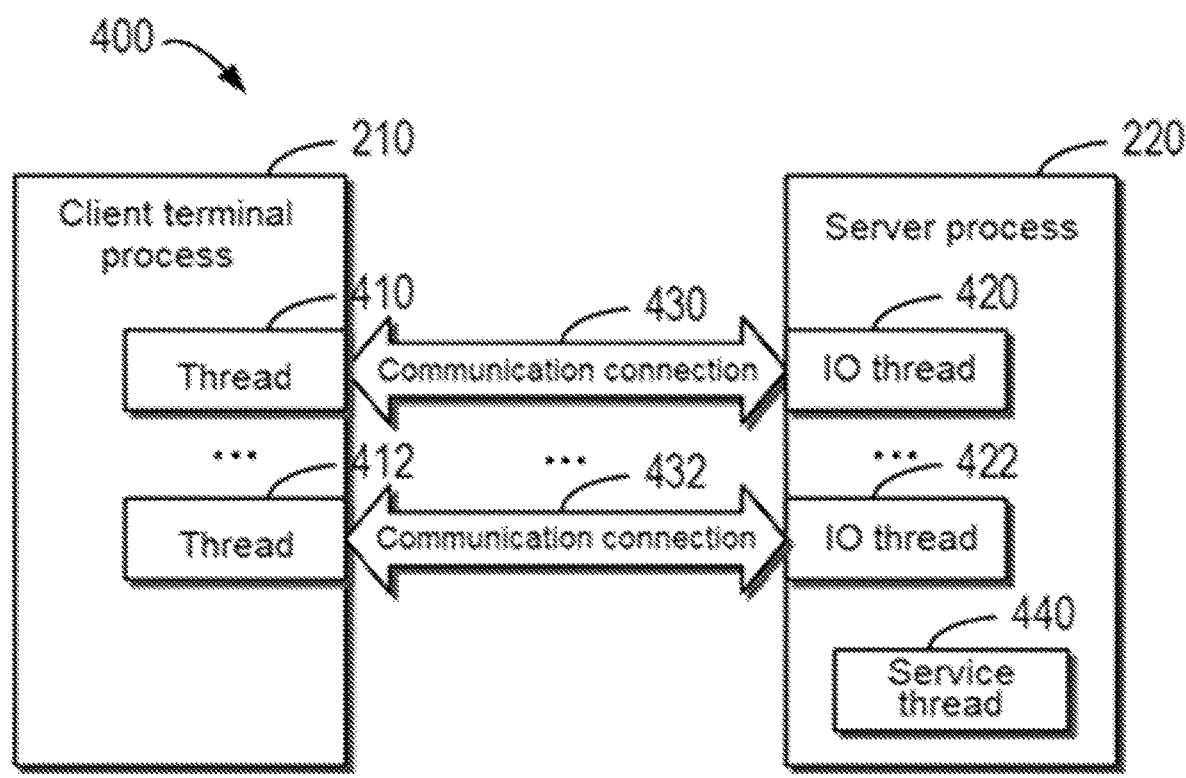
FIG. 4 schematically illustrates a block diagram for establishing a communication connection between a client terminal process and a server process according to an example implementation of the present disclosure.

It will be understood that client terminal process 210 may include one or more threads, and each thread may have its own communication connection. Hereinafter, more details regarding a communication connection will be described with reference to FIG. 4. FIG. 4 schematically illustrates block diagram 400 for establishing a communication connection between client terminal process 210 and server process 220 according to an example implementation of the present disclosure. In FIG. 4, client terminal process 210 includes multiple threads 410, . . . , and 412. At this point, each thread can send a connection request to server process 220. Service thread 440 in server process 220 can monitor requests from client terminal process 210 and, if receiving a request from a client terminal thread in client terminal process 210, can establish a communication connection between the client terminal thread and server process 220. Specifically, communication connection 420 can be established for thread 410, communication connection 422 can be established for thread 412, and so forth.

According to an example implementation of the present disclosure, server process 220 may include multiple IO threads 420, . . . , and 422. Specifically, IO thread 420 can manage communication connection 430, and IO thread 422 can manage communication connection 432. It will be understood that although FIG. 4 illustrates a situation where one IO thread manages one communication connection, according to an example implementation of the present disclosure, each IO thread can manage one or more communication connections. Although FIG. 4 illustrates only an example of establishing a communication connection between one client terminal process 210 and one server process 220, according to an example implementation of the present disclosure, one client terminal process 210 can establish communication connections with one or more other server processes, and one server process 220 can establish communication connections with one or more other client terminal processes.

According to an example implementation of the present disclosure, the roles of the client terminal process and the server process are relative, and when a certain process communicates with multiple other processes, that process can assume the functions of multiple roles. For example, when server process 220 initiates communication with another process, relative to that another process, server process 220 can further operate as a client terminal. It will be understood that although FIG. 4 illustrates only a situation where multiple IO threads 420, . . . , and 422 manage communication connections from the same client terminal process 210, according to an example implementation of the present disclosure, when multiple client terminal processes are connected to server process 220, these IO threads 420, . . . , and 422 can respectively manage multiple communication connections with multiple threads in the multiple client terminal processes.

Figure 5:
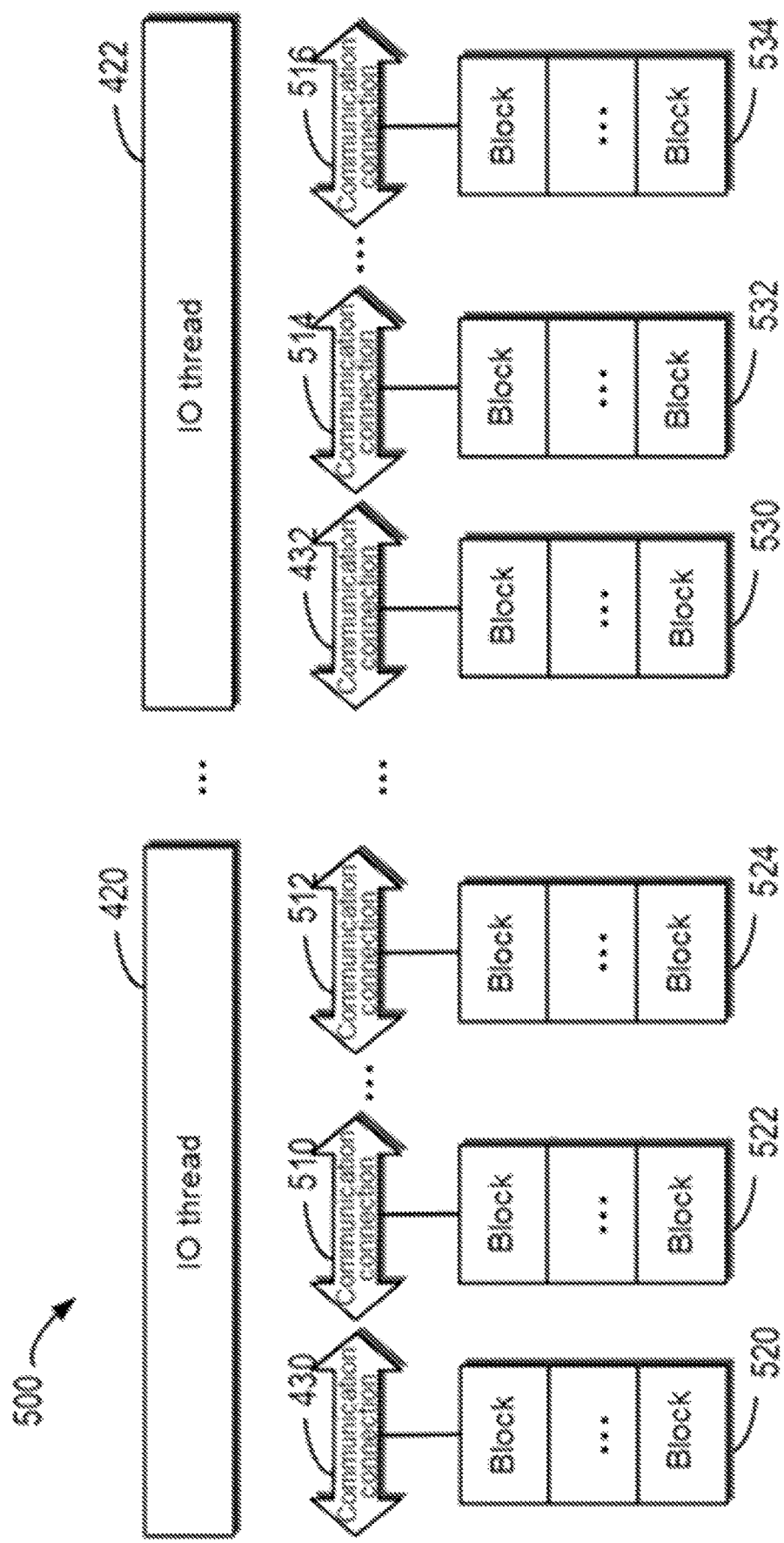
FIG. 5 schematically illustrates a block diagram of managing communication connections by input/output (IO or I/O) threads in a server process according to an example implementation of the present disclosure.

According to an example implementation of the present disclosure, the number of IO threads can be determined based on the number of processor cores in the computing device. In this manner, each processor core can schedule one IO thread, which in turn can improve the performance of the IO threads and improve the performance of entire server process 220. It will be understood that the number of IO threads cannot be increased indefinitely, and one IO thread can manage multiple communication connections when a large number of communication connections exist. Specifically, FIG. 5 schematically illustrates block diagram 500 for managing communication connections by IO threads in server process 220 according to an example implementation of the present disclosure. In FIG. 5, IO thread 420 can manage communication connections 430, 510, . . . , and 512 from one or more client terminal processes, IO thread 422 can manage communication connections 432, 514, . . . , and 516 from one or more client terminal processes, and so forth.

Figure 6:
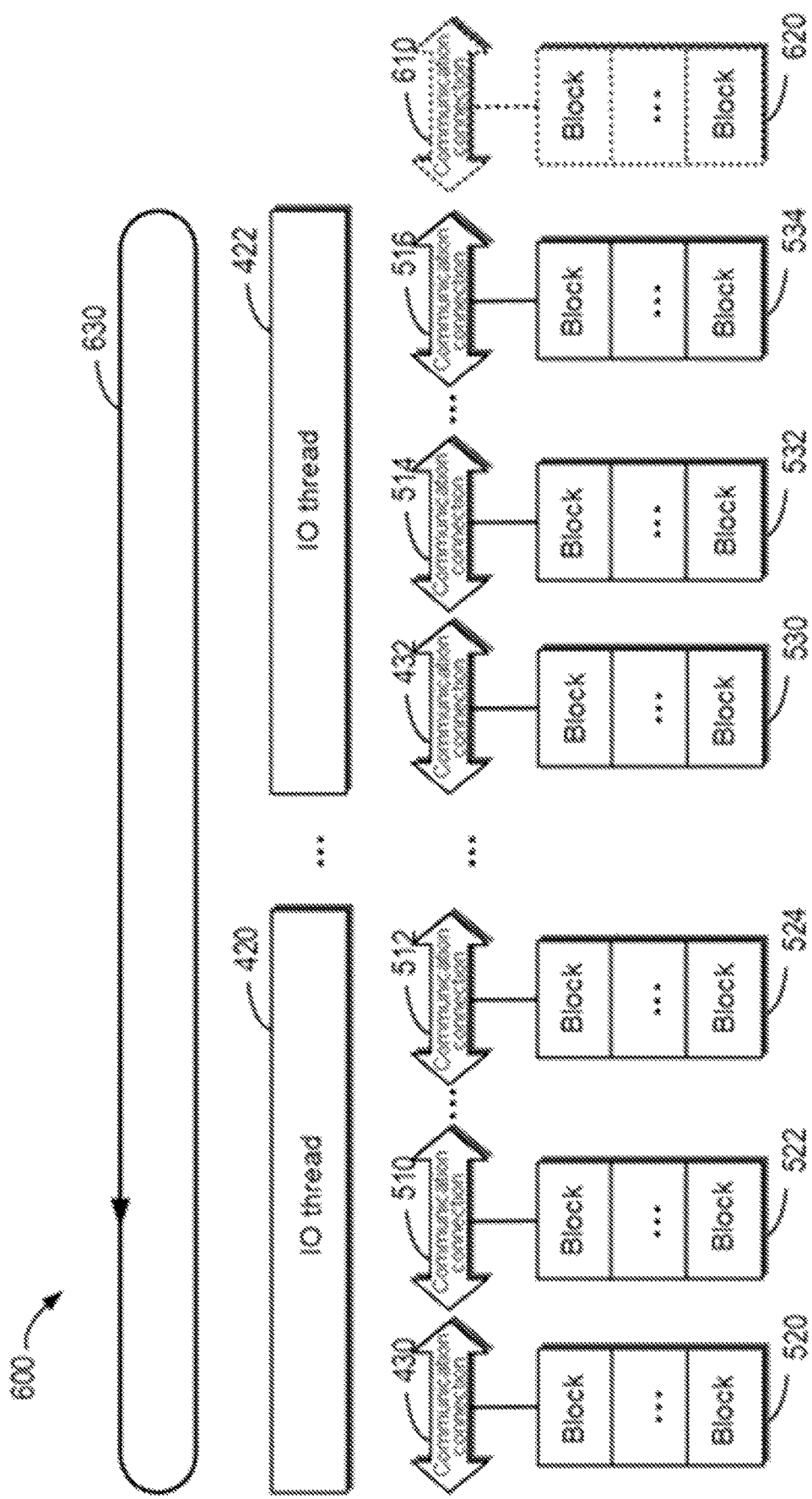
FIG. 6 schematically illustrates a block diagram of managing communication connections by multiple IO threads in a server process based on a polling manner according to an example implementation of the present disclosure.

Further, how to schedule multiple communication connections is described with reference to FIG. 6. FIG. 6 schematically illustrates block diagram 600 of managing communication connections by multiple IO threads in a server process based on a polling manner according to an example implementation of the present disclosure. As shown in FIG. 6, service threads in server process 220 can continuously monitor whether a new communication connection appears. If it is determined that new communication connection 610 appears, block 620 can be allocated to that communication connection 610. Further, IO threads with low workloads can be selected among multiple IO threads 420, . . . , and 422 based on the principle of load balancing. For example, one IO thread can be selected in sequence among the multiple IO threads in a polling manner 630 to control newly created communication connection 610.

Specific procedures related to establishing and managing communication connections have been described above, and hereinafter, more details of allocating shared storage blocks to communication connections will be described by returning to FIG. 3. At block 320 of FIG. 3, shared storage blocks 240 are allocated to communication connection 230 in response to determining that available shared storage blocks exist in the computing device. The computing device may include a shared block pool, and that shared block pool may be searched for available shared storage blocks. Here, the shared block pool has a predetermined size, and blocks may be defined to be of, for example, 2M, 4M, or other sizes. Still referring to FIG. 6, shared storage blocks can be allocated to each communication connection. For example, block 520 can be allocated to communication connection 430, block 522 can be allocated to communication connection 510, block 524 can be allocated to communication connection 512, block 530 can be allocated to communication connection 434, block 532 can be allocated to communication connection 514, block 534 can be allocated to communication connection 516, and so forth.

According to an example implementation of the present disclosure, if shared storage blocks 240 have been allocated to communication connection 230, the attribute of that communication connection 230 can be set to a "shared storage mode" to instruct client terminal process 210 and server process 220 to transmit data via shared storage blocks 240. At this point, shared storage blocks 240 can act as an intermediary between client terminal process 210 and server process 220 for the purpose of transmitting data.

Figure 7:
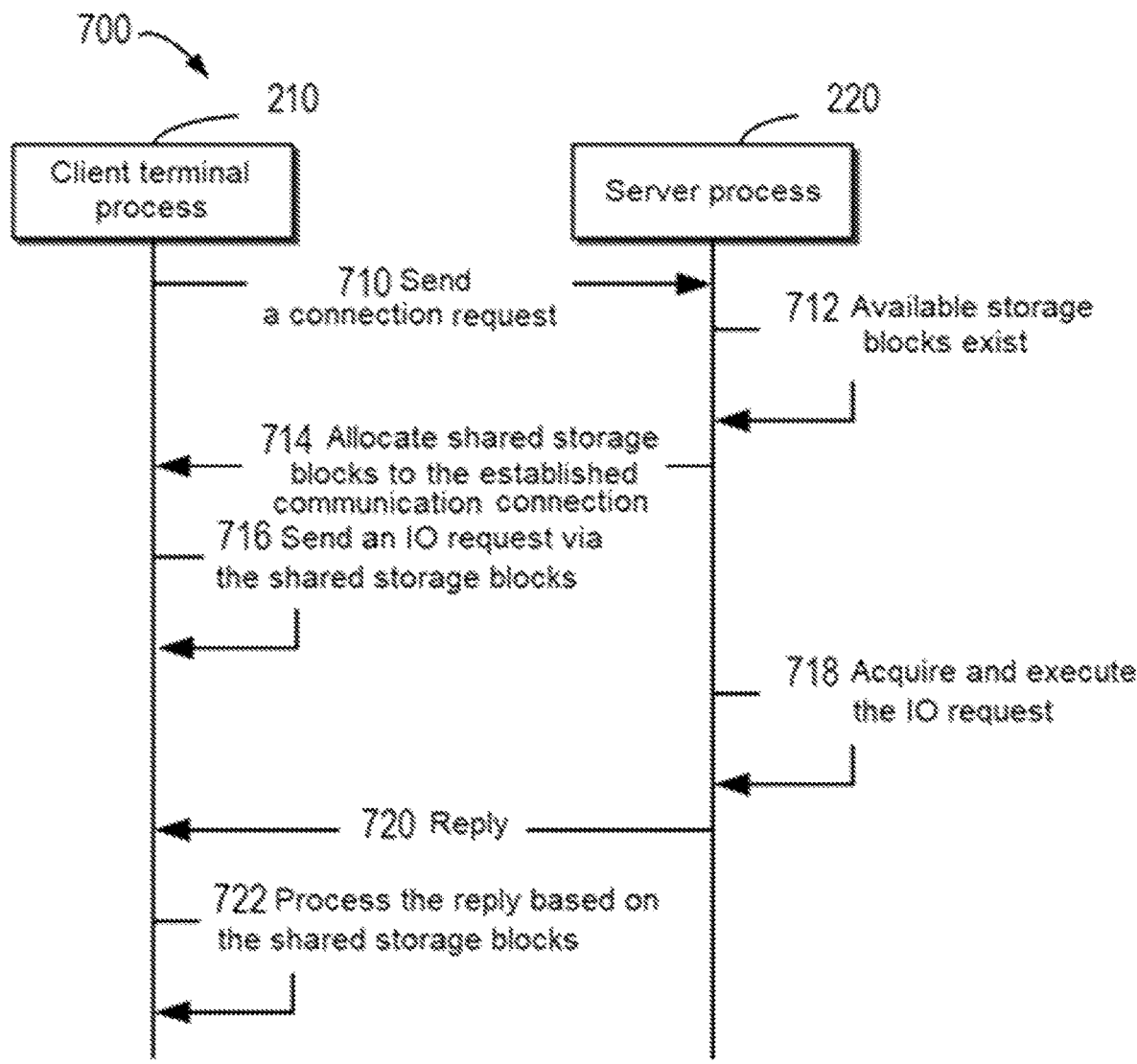
FIG. 7 schematically illustrates a block diagram of interaction between a client terminal process and a server process according to an example implementation of the present disclosure.

Returning to FIG. 3, at block 330, data is transmitted between client terminal process 210 and server process 220 using shared storage blocks 240. Specifically, client terminal process 210 can write an IO request to shared storage blocks 240 so that server process 220 can respond accordingly. Hereinafter, more details regarding data transmission between client terminal process 210 and server process 220 will be described with reference to FIG. 7. FIG. 7 schematically illustrates block diagram 700 of interaction between a client terminal process and a server process according to an example implementation of the present disclosure. As shown in FIG. 7, client terminal process 210 can send 710 a connection request to server process 220 so as to establish a communication connection between client terminal process 210 and 220. Server process 220 can check 712 whether available blocks exist in the shared block pool. If such blocks exist, client terminal process 210 can allocate shared storage blocks to the established communication connection.

At this point, the shared storage blocks have already been allocated for transmitting data between client terminal process 210 and server process 220. Thereafter, client terminal process 210 can send 716 an IO request to server process 220 via the shared storage blocks. The IO request may include a sending request and a receiving request, and an example of a sending request will be described first. At this point, in the "shared storage mode," client terminal process 210 can write in the shared storage blocks an IO request to send data. For example, a sending request and data to be sent can be written to the shared storage blocks for the server process to read.

The server process can acquire and execute 718 the IO request from the shared storage blocks. Server process 220 can determine the type of the IO request, and for the sending request, server process 220 can read the sent data from the shared storage blocks. After the IO request has been executed, server process 220 can send 720 a reply to client terminal process 210 to notify client terminal process 210 to acquire a result of executing the IO. The reply to the sending request may indicate that: server process 220 has received the sent data so that client terminal process 210 can process 722 the reply based on the shared storage blocks.

For the receiving request, client terminal process 210 can write in the shared storage blocks an IO request to receive data. For example, it is possible to write a receiving request to the shared storage blocks and wait for server process 220 to write data into the shared storage blocks. Server process 220 can write data to be received to the shared storage blocks, and at this point, the reply can notify client terminal process 210 to retrieve from the shared storage blocks the data written in by server process 220.

It will be understood that, as server process 220 runs, available blocks in the shared block pool may be exhausted. When a new communication connection is detected by service thread 440 in server process 220, there may no longer be blocks available for allocation in the shared block pool. At this point, the attribute of the communication connection can be set to a "non-shared storage mode" to instruct client terminal process 210 and server process 220 to transmit data via the communication connection.

When the attribute of the communication connection is the "non-shared storage mode," client terminal process 210 and server process 220 can transmit data in accordance with the UDS connection manner in existing technical solutions. For example, client terminal process 210 can transmit data to server process 220 via that UDS communication connection. Although the transmission speed of the UDS-based communication connection at this point may be lower than the speed of transmitting data using the shared storage blocks, the UDS communication connection can still support data transmission between the two processes when the storage blocks have been exhausted.

Figure 8:
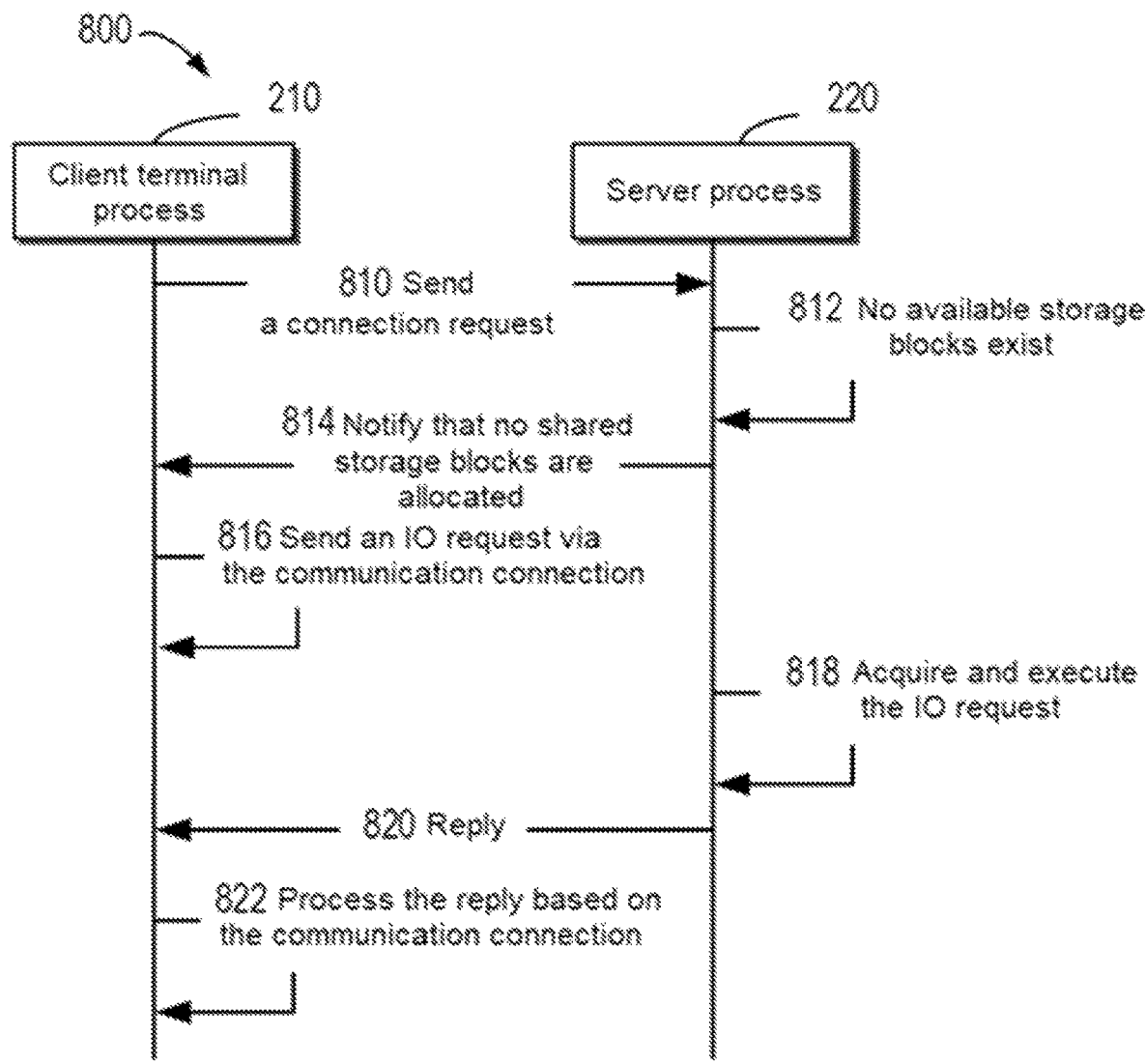
FIG. 8 schematically illustrates a block diagram of interaction between a client terminal process and a server process according to an example implementation of the present disclosure.

Hereinafter, inter-process communication procedures using a UDS communication connection will be described with reference to FIG. 8. FIG. 8 schematically illustrates block diagram 800 of interaction between a client terminal process and a server process according to an example implementation of the present disclosure. As shown in FIG. 8, client terminal process 210 can send 810 a connection request to server process 220 in order to establish a communication connection. Server process 220 can check whether available storage blocks exist and, if determining 812 that no available storage blocks exist, can notify 814 that no shared storage blocks are allocated. At this point, client terminal process 210 can send 816 an IO request via the established communication connection based on the existing UDS connection manner.

Server process 220 can acquire 818 the IO request from the UDS communication connection and execute that IO request. After the IO request has been executed, a reply can be sent 810 to client terminal process 210 to notify client terminal process 210 to perform subsequent steps. Thereafter, client terminal process 210 can retrieve, based on the UDS communication connection, data from server process 220 or an acknowledgment indicating that server process 220 has received the data. Here, the specific operation of step 822 in FIG. 8 is similar to the specific operation of step 722 in FIG. 7, except that step 822 is executed via a UDS communication connection and step 722 is executed based on shared storage blocks that have been allocated to that UDS.

According to an example implementation of the present disclosure, it is possible to continuously check whether available blocks exist in the storage resource pool and, if such blocks exist, to allocate shared storage blocks for the established communication connection. During the subsequent communication process, client terminal process 210 can further perform inter-process communication based on the shared storage blocks. According to an example implementation of the present disclosure, the approach to assist inter-process communication can be adjusted at any moment: a UDS communication connection is utilized to transmit data when storage space is insufficient, and shared storage space is utilized to transmit data when the storage space is sufficient. In this manner, the available storage space in the computing device can be fully utilized as much as possible, thereby improving the performance of inter-process communication.

It will be understood that, as the computing device runs, if the inter-process data transmission requirements have been completed, the communication connection between two processes can be disconnected. At this point, the shared storage blocks that have been allocated for that communication connection are no longer needed, and thus can be released. At this point, the number of available blocks in the shared resource pool will be increased, and the released blocks can be allocated to other communication connections. According to an example implementation of the present disclosure, these blocks can be allocated to communication connections that have been established but have not yet been allocated with shared storage blocks. Alternatively and/or additionally, these blocks can be allocated to newly established communication connections.

In a practical operating environment, client terminal process 210 and server process 220 can be written in the same or different programming languages. Because formats and access approaches of address spaces accessible to different programming languages are different, processes written in different languages cannot directly access the allocated shared memory blocks. According to an example implementation of the present disclosure, an address mapping can be established to allocate shared memory blocks accessible by different types of processes to communication connections.

Figure 9:
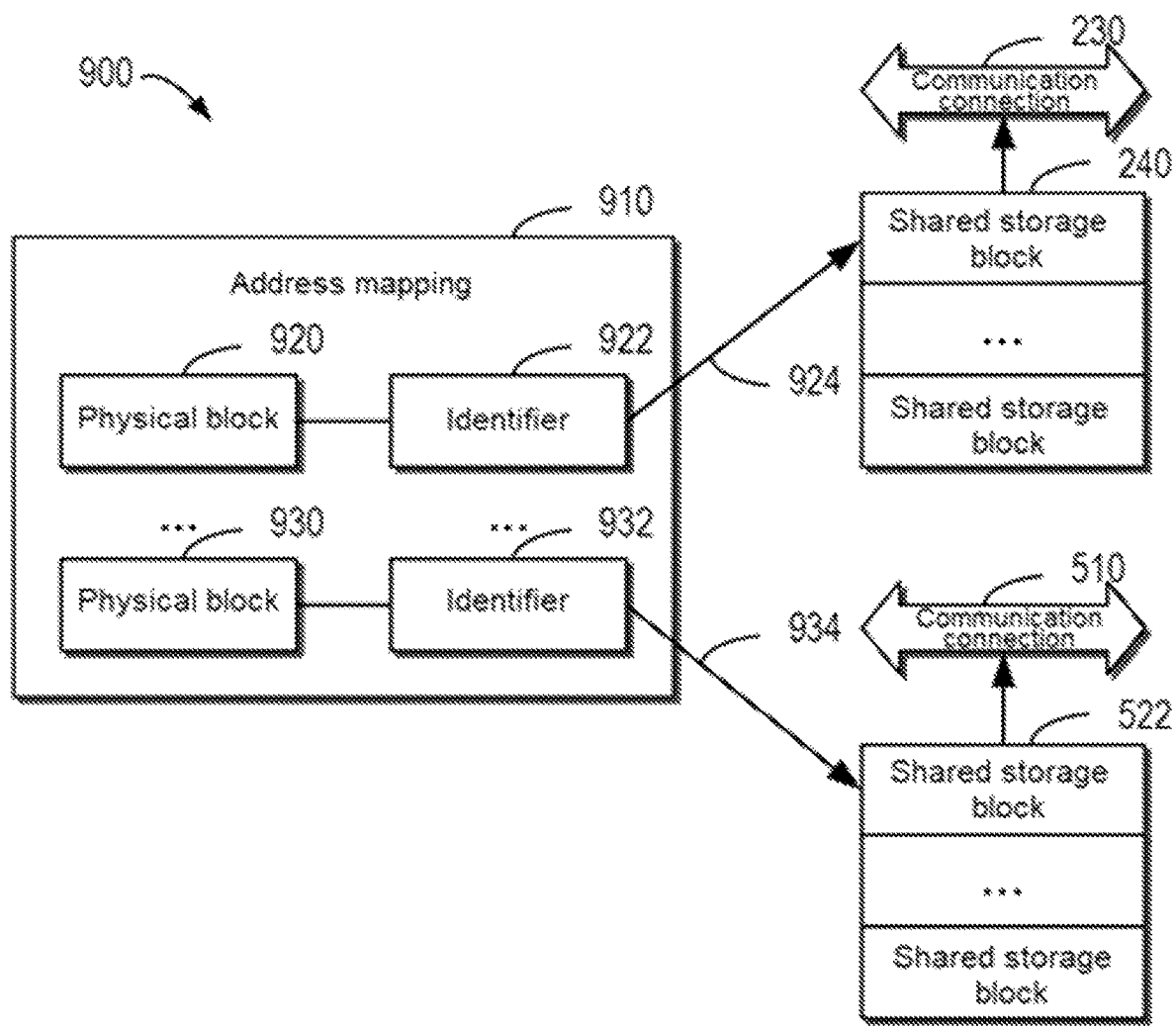
FIG. 9 schematically illustrates a block diagram of an address mapping between physical blocks in a computing device and identifiers according to an example implementation of the present disclosure.

Hereinafter, more details about the address mapping will be described with reference to FIG. 9. FIG. 9 schematically illustrates block diagram 900 of an address mapping between physical blocks in a computing device and identifiers according to an example implementation of the present disclosure. As shown, addresses of the shared storage blocks (e.g., addresses of physical blocks 920, . . . , and 930) in the computing device can be acquired. Further, a mapping relationship between the above addresses and identifiers of the shared storage blocks can be established. In other words, as shown in address mapping 910, each physical block can be represented by an identifier. For example, identifier 922 can be used to represent physical block 920, identifier 932 can be used to represent physical block 930, etc. At this point, the client terminal process can be instructed to access the shared storage blocks via the identifiers.

Identifier 922 can be utilized to indicate shared storage block 240 allocated to communication connection 230, as indicated by arrow 924; and identifier 932 can be utilized to indicate shared storage block 522 allocated to communication connection 510, as indicated by arrow 934. Table 1 below schematically illustrates an address mapping according to an example implementation of the present disclosure.

TABLE 1

Example of Address Mapping

| Start Address | End Address | Attribute | Node | File name |
|---|---|---|---|---|
| 0x02 . . . 00 | 0x04 . . . 00 | rw-s | 1582040 | /dev/hugepages/spdk_map0 |
| 0x04 . . . 00 | 0x06 . . . 00 | rw-s | 1878272 | /dev/hugepages/spdk_map1 |
| . . . | | | | |
| 0x14 . . . 00 | 0x16 . . . 00 | rw-s | 1701715 | /dev/hugepages/spdk_map9 |

In Table 1, the first column indicates start addresses of physical addresses of physical blocks in the computing device, the second column indicates end addresses of the physical addresses of the physical blocks in the computing device (in this example, the block size is 2M), the third column indicates read/write attributes of the physical blocks, the fourth column indicates unique node identifiers of the physical blocks, and the fifth column indicates file names, i.e. identifiers, corresponding to the physical blocks. At this point, client terminal process 210 can directly access the data in the allocated shared storage blocks by the file names. It will be understood that although Table 1 illustrates an example of blocks having a size of 2M, according to an example implementation of the present disclosure, the blocks can also have other sizes.

According to an example implementation of the present disclosure, different sizes of shared storage space can be allocated for communication connections according to the amount of data to be transmitted between processes. For example, in a case where the block size is 2M, 1 block can be allocated for one communication connection and 2 or more blocks can be allocated for another communication connection. With the example implementations of the present disclosure, it is not necessary to care about which programming language is used to write each process, but each process can directly use identifiers to access data in allocated shared storage blocks. In this manner, a uniform access portal to shared storage blocks can be provided to the processes and the impact of different programming languages can be eliminated.

Compared with existing technical solutions that use only UDS communication connections to transmit data, by allocating shared storage blocks to UDS communication connections, more shared storage space can be allocated for two processes according to data transmission requirements. In this manner, the bandwidth of inter-process data transmission can be increased, and the transmission delay can be reduced.

Examples of the method according to the present disclosure have been described in detail above with reference to FIGS. 2 to 9, and implementations of a corresponding apparatus will be described below. According to an example implementation of the present disclosure, there is provided.

According to an example implementation of the present disclosure, this apparatus further includes modules for performing other steps in method 300 described above.

Figure 10:
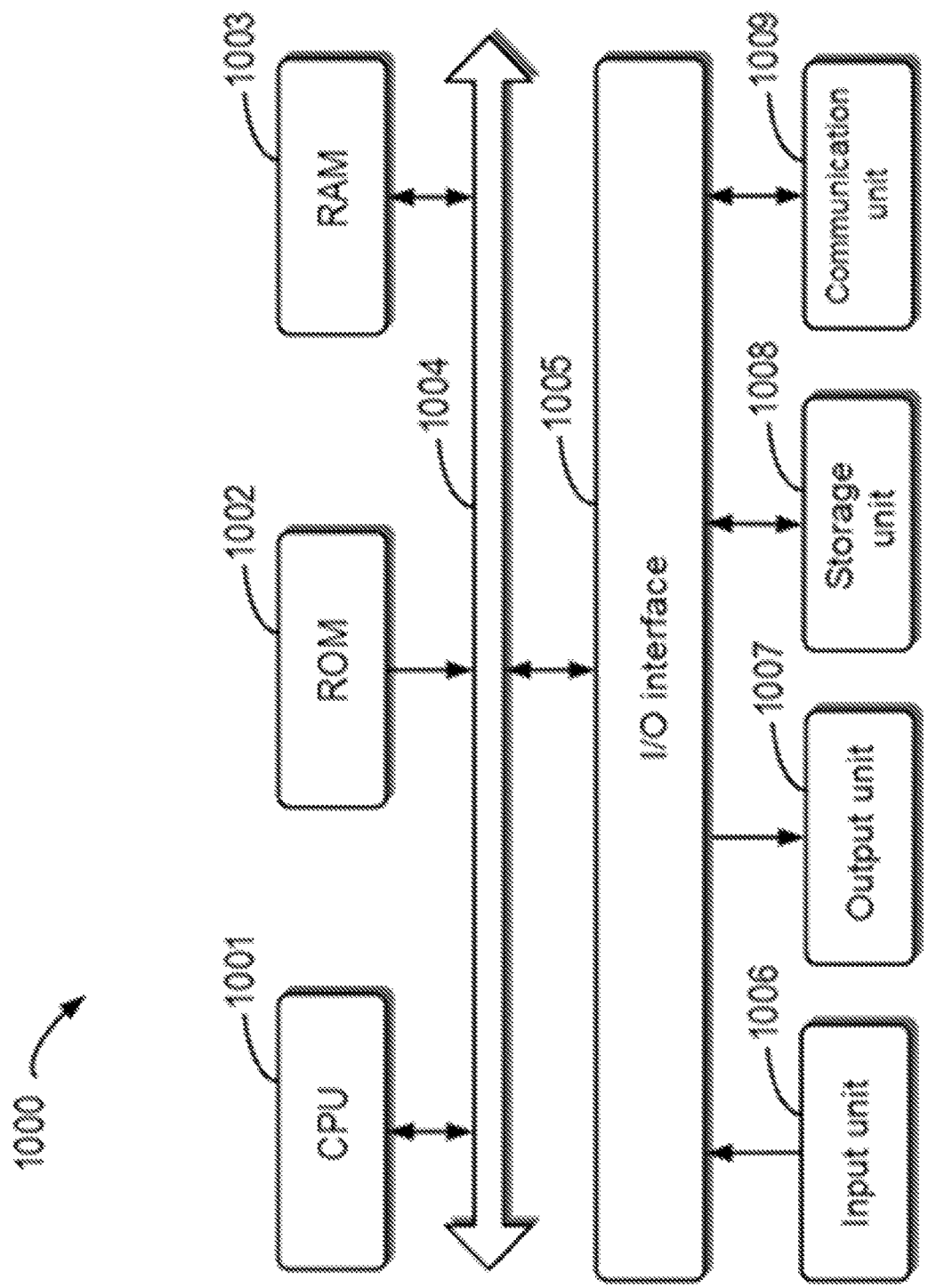
FIG. 10 schematically illustrates a block diagram of a device for transmitting data between multiple processes according to an example implementation of the present disclosure.

FIG. 10 schematically illustrates a block diagram of device 1000 for transmitting data between multiple processes according to an example implementation of the present disclosure. As shown in the drawing, device 1000 includes central processing unit (CPU) 1001 that may perform various appropriate actions and processing according to computer program instructions stored in read-only memory (ROM) 1002 or computer program instructions loaded from storage unit 1008 into random access memory (RAM) 1003. Various programs and data required for the operation of device 1000 may also be stored in RAM 1003. CPU 1001, ROM 1002, and RAM 1003 are connected to each other through bus 1004. I/O interface 1005 is also connected to bus 1004.

Multiple components in device 1000 are connected to I/O interface 1005, including: input unit 1006, such as a keyboard and a mouse; output unit 1007, such as various types of displays and speakers; storage unit 1008, such as a magnetic disk and an optical disc; and communication unit 1009, such as a network card, a modem, and a wireless communication transceiver. Communication unit 1009 allows device 1000 to exchange information/data with other devices via a computer network, such as the Internet, and/or various telecommunication networks.

The various processes and processing procedures described above, such as method 300, may be performed by processing unit 1001. For example, in some implementations, method 300 may be implemented as a computer software program that is tangibly included in a machine-readable medium, such as storage unit 1008. In some implementations, part or all of the computer program may be loaded and/or installed onto device 1000 via ROM 1002 and/or communication unit 1009. One or more steps of method 300 described above may be performed when the computer program is loaded into RAM 1003 and executed by CPU 1001. Alternatively, in other implementations, CPU 1001 may also be configured in any other suitable manner to implement the above processes/methods.

According to an example implementation of the present disclosure, an electronic device is provided, including: at least one processor; a volatile memory; and a memory coupled to the at least one processor, wherein the memory has instructions stored therein which, when executed by the at least one processor, cause the device to perform actions for transmitting data between multiple processes. The actions include: establishing, in response to receiving a request to transmit data between a client terminal process and a server process in a computing device, a communication connection between the client terminal process and the server process; allocating shared storage blocks to the communication connection in response to determining that available shared storage blocks exist in the computing device; and transmitting data between the client terminal process and the server process using the shared storage blocks.

According to an example implementation of the present disclosure, allocating the shared storage blocks to the communication connection includes: setting the attribute of the communication connection to a "shared storage mode" to instruct the client terminal process and the server process to transmit data via the shared storage blocks.

According to an example implementation of the present disclosure, in response to determining that no available shared storage blocks exist in the computing device, the attribute of the communication connection is set to a "non-shared storage mode" to instruct the client terminal process and the server process to transmit data via the communication connection.

According to an example implementation of the present disclosure, establishing the communication connection between the client terminal process and the server process includes: receiving the request from a client terminal thread in the client terminal process, and establishing the communication connection between the client terminal thread and the server process; and the actions further include: establishing, in response to receiving another request from another client terminal thread in the client terminal process, another communication connection between the client terminal thread and the server process.

According to an example implementation of the present disclosure, in response to determining that multiple communication connections exist between the client terminal process and the server process, the multiple communication connections are managed respectively using multiple server threads in the server process.

According to an example implementation of the present disclosure, the multiple server threads are run by multiple processor cores of the computing device, respectively.

According to an example implementation of the present disclosure, the client terminal process and the server process are written using different programming languages, wherein allocating the shared storage blocks to the communication connection includes: acquiring addresses of the shared storage blocks in the computing device; establishing a mapping relationship between the addresses and identifiers of the shared storage blocks; and instructing the client terminal process to access the shared storage blocks via the identifiers.

According to an example implementation of the present disclosure, transmitting data between the client terminal process and the server process using the shared storage blocks includes at least any one of the following: instructing the client terminal process to send data to the server process via the shared storage blocks; and instructing the client terminal process to receive data from the server process via the shared storage blocks.

According to an example implementation of the present disclosure, the actions further include: in response to receiving a request to stop the data transmission, disconnecting the communication connection; and releasing the shared storage blocks allocated to the communication connection.

According to an example implementation of the present disclosure, the actions are executed at the server process.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided, the computer-readable medium storing machine-executable instructions which, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from a network and forwards the computer-readable program instruction for storage in the computer-readable storage medium in the computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, or partly on a user computer, or as a stand-alone software package, or partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

What is claimed is:

1. A method, comprising:
   in response to receiving a request to transmit data between a client terminal process and a server process in a computing device, establishing, by a system comprising a processor, a communication connection between the client terminal process and the server process; and
   in response to determining that available shared storage blocks exist in the computing device,
      allocating shared storage blocks to the communication connection comprising setting an attribute of the communication connection to a shared storage mode to instruct the client terminal process and the server process to transmit the data using the shared storage blocks, and
      transmitting the data between the client terminal process and the server process using the shared storage blocks; or
   in response to determining that no available shared storage blocks exist in the computing device,
      setting the attribute of the communication connection to a non-shared storage mode to instruct the client terminal process and the server process to transmit the data via the communication connection not using any shared storage blocks, and
      transmitting the data between the client terminal process and the server process without using any shared storage blocks.

2. The method according to claim 1, wherein the establishing of the communication connection between the client terminal process and the server process comprises:
   receiving the request from a client terminal thread in the client terminal process, and
   establishing the communication connection between the client terminal thread and the server process; and
   the method further comprises:
   in response to receiving another request from another client terminal thread in the client terminal process, establishing another communication connection, other than the communication connection, between the client terminal thread and the server process.

3. The method according to claim 2, further comprising:
   in response to determining that multiple communication connections exist between the client terminal process and the server process, managing the multiple communication connections respectively using multiple server threads in the server process.

4. The method according to claim 3, wherein the multiple server threads are executed by multiple processor cores of the computing device, respectively.

5. The method according to claim 1, wherein the client terminal process and the server process are written using different programming languages, and wherein the allocating of the shared storage blocks to the communication connection comprises:
   acquiring addresses of the shared storage blocks in the computing device;
   establishing a mapping relationship between the addresses and identifiers of the shared storage blocks; and
   instructing the client terminal process to access the shared storage blocks via the identifiers.

6. The method according to claim 1, wherein the transmitting of the data between the client terminal process and the server process using the shared storage blocks comprises at least one of:
   instructing the client terminal process to send first data to the server process using the shared storage blocks; or
   instructing the client terminal process to receive second data from the server process using the shared storage blocks.

7. The method according to claim 1, further comprising:
   in response to receiving a request to stop the data from being transmitted,
      disconnecting the communication connection; and
      releasing the shared storage blocks that were allocated to the communication connection.

8. The method according to claim 1, wherein the method is executed at the server process.

9. A device, comprising:
at least one processor; and
at least one memory coupled to the at least one processor, wherein the at least one memory has instructions stored therein which, when executed by the at least one processor, cause the device to perform operations, comprising:
establishing, in response to receiving a request to transmit data between a client terminal process and a server process in a computing device, a communication connection between the client terminal process and the server process; and
in response to determining that no available shared storage blocks exist in the computing device,
setting an attribute of the communication connection to a non-shared storage mode to instruct the client terminal process and the server process to transmit the data via the communication connection, and
transmitting the data between the client terminal process and the server process according to the non-shared storage mode; or
in response to determining that available shared storage blocks exist in the computing device,
allocating shared storage blocks to the communication connection comprising setting the attribute of the communication connection to a shared storage mode to instruct the client terminal process and the server process to transmit the data via the shared storage blocks, and
transmitting the data between the client terminal process and the server process via the shared storage blocks.

10. The device according to claim 9, wherein the establishing of the communication connection between the client terminal process and the server process comprises: receiving the request from a client terminal thread in the client terminal process, and establishing the communication connection between the client terminal thread and the server process; and
the operations further comprise: establishing, in response to receiving another request from another client terminal thread in the client terminal process, another communication connection between the client terminal thread and the server process.

11. The device according to claim 10, further comprising: managing, in response to determining that multiple communication connections exist between the client terminal process and the server process, the multiple communication connections respectively using multiple server threads in the server process.

12. The device according to claim 11, wherein the multiple server threads are run by multiple processor cores of the computing device, respectively, and the operations are executed at the server process.

13. The device according to claim 9, wherein the client terminal process and the server process are written using different programming languages, and wherein the allocating of the shared storage blocks to the communication connection comprises:
acquiring addresses of the shared storage blocks in the computing device;
establishing a mapping relationship between the addresses and identifiers of the shared storage blocks; and
instructing the client terminal process to access the shared storage blocks via the identifiers.

14. The device according to claim 9, wherein the transmitting of the data between the client terminal process and the server process via the shared storage blocks comprises at least one of:
instructing the client terminal process to send at least some of the data to the server process via the shared storage blocks; or
instructing the client terminal process to receive at least some of the data from the server process via the shared storage blocks.

15. A computer program product tangibly stored on a non-transitory computer-readable medium and comprising machine-executable instructions, that, in response to execution thereof, perform operations, comprising:
in response to receiving a request to transmit data between a client terminal process and a server process in computing equipment, establishing, by a system comprising a processor, a communication connection between the client terminal process and the server process, wherein the client terminal process and the server process are written using different programming languages;
in response to determining that available shared storage blocks exist in the computing equipment, allocating shared storage blocks to the communication connection, the allocating comprising:
acquiring addresses of the shared storage blocks in the computing equipment,
establishing a mapping relationship between the addresses and identifiers of the shared storage blocks, and
instructing the client terminal process to access the shared storage blocks via the identifiers; and
transmitting the data between the client terminal process and the server process using the shared storage blocks, the transmitting comprising at least one of:
instructing the client terminal process to send first data to the server process using the shared storage blocks, or
instructing the client terminal process to receive second data from the server process using the shared storage blocks.

16. The computer program product according to claim 15, wherein the operations further comprise:
in response to receiving a request to stop the transmitting of the data, disconnecting the communication connection.

17. The computer program product according to claim 16, wherein the operations further comprise:
in further response to receiving the request to stop the transmitting of the data,
releasing the shared storage blocks that were allocated to the communication connection.

18. The computer program product according to claim 15, wherein the establishing of the communication connection between the client terminal process and the server process comprises:
prior to the establishing, receiving the request from a client terminal thread in the client terminal process, and
wherein the operations further comprise:
in response to receiving another request from another client terminal thread in the client terminal process, establishing another communication connection, other than the communication connection, between the client terminal thread and the server process.

19. The computer program product according to claim 15, wherein the operations further comprise:
   in response to determining that multiple communication connections exist between the client terminal process and the server process, managing the multiple communication connections respectively using multiple server threads in the server process,
   wherein the multiple server threads are executed by multiple processor cores of the computing equipment, respectively.

20. The computer program product according to claim 15, wherein the operations are executed by the server process.

* * * * *